(12) United States Patent
Schweid

(10) Patent No.: US 8,560,585 B2
(45) Date of Patent: Oct. 15, 2013

(54) METHOD FOR DEQUANTIZATION OF 1-D LUT CORRECTION CURVES

(75) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 588 days.

(21) Appl. No.: 12/901,234

(22) Filed: Oct. 8, 2010

(65) Prior Publication Data
US 2012/0089654 A1    Apr. 12, 2012

(51) Int. Cl.
*G06F 7/00* (2006.01)
*G06F 15/00* (2006.01)

(52) U.S. Cl.
USPC .......................................................... 708/204

(58) Field of Classification Search
USPC .......................................................... 708/204
See application file for complete search history.

(56) References Cited

U.S. PATENT DOCUMENTS

| | | | |
|---|---|---|---|
| 5,293,539 A * | 3/1994 | Spence | 358/527 |
| 5,768,425 A * | 6/1998 | Praveen et al. | 358/3.22 |
| 5,926,647 A * | 7/1999 | Adams et al. | 712/36 |
| 6,097,836 A * | 8/2000 | Inoue | 382/165 |
| 6,346,994 B1 * | 2/2002 | Inoue | 358/1.9 |
| 2007/0229863 A1 * | 10/2007 | Ono et al. | 358/1.9 |

* cited by examiner

*Primary Examiner* — Chuong D Ngo
*Assistant Examiner* — Kevin G Hughes
(74) *Attorney, Agent, or Firm* — Michael J. Nickerson; Basch & Nickerson LLP

(57) ABSTRACT

A method is described to combine two integer lookup tables to realize a single integer lookup table. The method converts each lookup table to a set of floating point values. The conversion process generates a set of floating point values that are as close as possible to the underlying analytic or smooth function that generated the tables in the first place. A system to implement the method is also described.

19 Claims, 6 Drawing Sheets

METHOD FOR DEQUANTIZATION OF 1-D LUT CORRECTION CURVES

BACKGROUND AND SUMMARY

The use of lookup tables is common in modern image processing applications. Lookup tables are used to allow an empirically derived function to be applied to the data in an image processing workflow.

Moreover, lookup tables can be used to apply a complex analytic function to the data in an image processing workflow so as to reduce the computational load associated with a complex function, for example a logarithmic function.

Furthermore, in many other image processing pipelines, several 1-D lookup tables can be applied sequentially to an image. These lookup tables typically only carry eight (8) bits of accuracy, and thus, sequential application of two or more of the lookup tables may introduce significant quantization errors into the image. These quantization errors are typically manifested as either loss of detail when several input gray levels map to the same output gray value or as contouring when the difference in the output gray levels is a significantly larger than that of the input gray levels of the image.

One solution is to expand the image path to more bits; e.g., ten (10) bits, but this solution requires significant resources and additionally carries the burden of increased cost of implementation.

Typically, the effects of the resultant quantization error are accepted.

During the design and construction of the image path, the sequential lookup tables are defined, and the sequential lookup tables may be combined by using the underlying analytic functions before quantization.

However, there are cases in which one or more of the lookup tables may be generated during the use of the machine, for example, in response to user input or to changes in the underlying hardware or reproduction devices. In such a case, a method to combine lookup tables that are fixed with lookup tables that change in response to an external event that avoids a loss of accuracy would be preferable to reduce quantization errors.

As an example, FIG. 1 shows in schematic form an image path with two lookup tables (106, 108). The image path comprises an interface 102 that interfaces with the input device. Interface 102 accepts the digital image from the input image source and may format the digital image or convert the digital image in many different conventional, as would be appreciated to by those skilled in the art.

The output of interface 102 is passed to processor 104 where any further processing of the image takes place. Such further processing can include conversion of color space, magnification of the image, storage of the image, or other image processing operations.

The output of this stage is commonly passed on for printing. In such a case, it is also common to adjust the tone curve of the image to match the characteristics of the printing engine. Since this is usually an empirically derived characteristic, it is commonly implemented as a lookup table 106.

However, it is also common to allow the user of the machine to adjust the output characteristics. One output characteristic that the user may be allowed to adjust is the tone curve.

To conventionally adjust the tone curve, the digital image passes through another lookup table where the contents of the lookup table are determined by the user's choice of modifications. Such a modification lookup table is shown as lookup table 108 of FIG. 1.

However, the actual hardware implementation may include a single lookup table. In such a case, the printer characterization lookup table must be combined or modified in a way that includes any user chosen adjustments.

BRIEF DESCRIPTION OF THE DRAWING

The drawings are only for purposes of illustrating various embodiments and are not to be construed as limiting, wherein.

DETAILED DESCRIPTION

Figure 1:
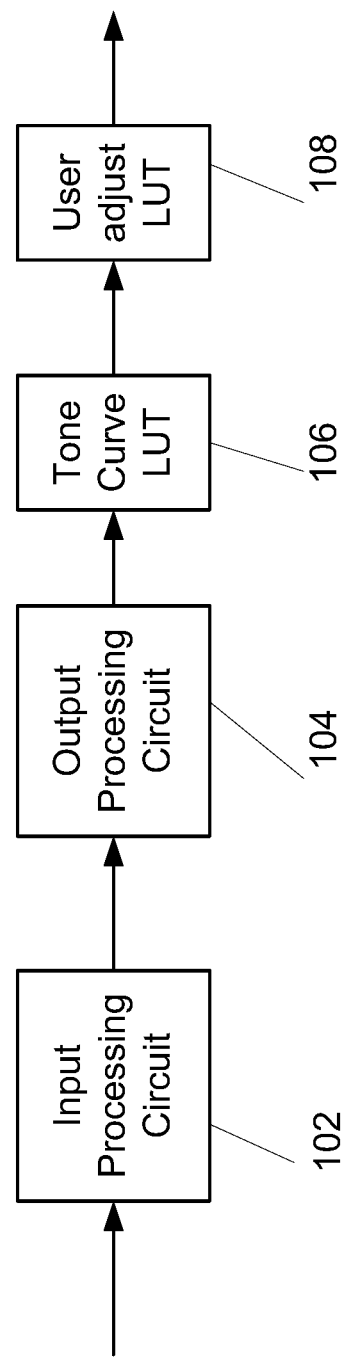
FIG. 1 illustrates a block diagram of an image path using a lookup table.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 2:
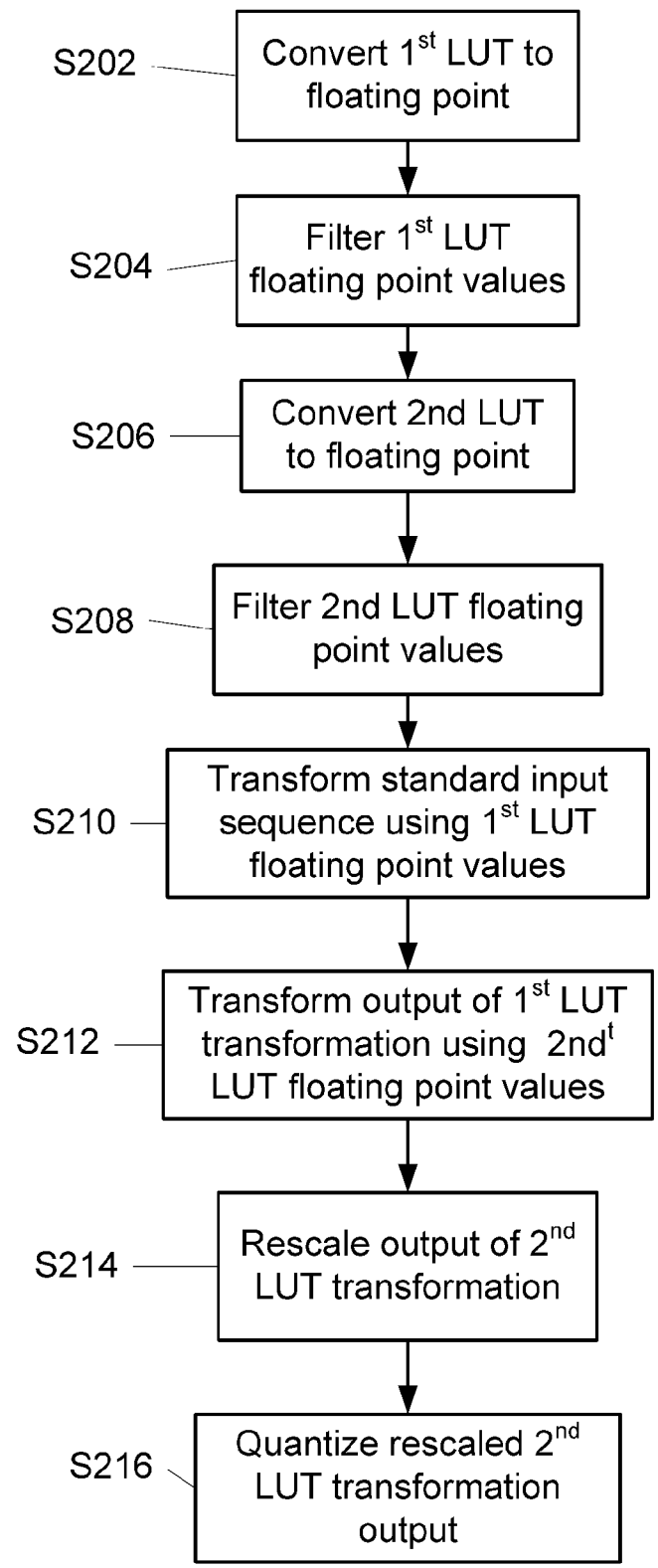
FIG. 2 illustrates a method of combining two lookup tables into a single table.

FIG. 2 illustrates a method for combining two lookup tables to form a single table that can produce the same result as would have been obtained by combining two lookup tables but without quantization errors.

In the following description, for the sake of clarity, it is assumed that the lookup tables are 1-dimensional, 8-bit tables. That is, the table contains 256 ($2^8$) entries and a single 8-bit output value for each entry. While lookup tables are not restricted to only eight (8) bits or only one dimension, the process to be described is actually independent of the exact size and scope of the lookup table.

For example an image path that supports color processing might have three lookup tables, one for each of the primary colors. While such an image path is more complex than the single table example being used, the process to combine the parallel lookup tables is the same.

In step S202, the process begins by converting the set of values in the first lookup table to a set of equivalent floating point values. The conversion process extracts a set of values that match the original analytic function that originally generated the table as closely as possible. In other words, the conversion should generate a set of floating point values that represent a smooth function even if the original table was generated empirically.

There are several ways to implement the conversion function. The input values of the table can be presented as a sequence of 256 values that are passed through a low-pass filter. The low-pass filter need not be elaborate—a simple (1, 2, 1) set of filter weights can suffice in many cases.

The conversion may be done by fitting a polynomial function to the table values and then using the fitted set of polynomials to generate the desired floating point values. The fitting may be realized in a piecewise fashion.

The conversion could also be done using some form of spline fitting to generate a smooth curve through the values of the table. Another alternative to the conversion would be to fit some sort of minimax function, e.g. a Chebyshev polynomial to the values in the table.

Regardless of the method used to perform the conversion, the output of step S202 is a set of floating point values. However, because of the characteristics of the conversion process used and any quantization artifacts that were part of the table generation, the converted set of floating point values may contain large differences between the converted floating point value and the integer value in the table.

Since it is assumed that the underlying continuous function represented by the table is smooth, these large differences are an undesirable artifact. Hence the floating point values are further filtered in step S204. The filtering can include a non-linear limiting function.

Figure 3:
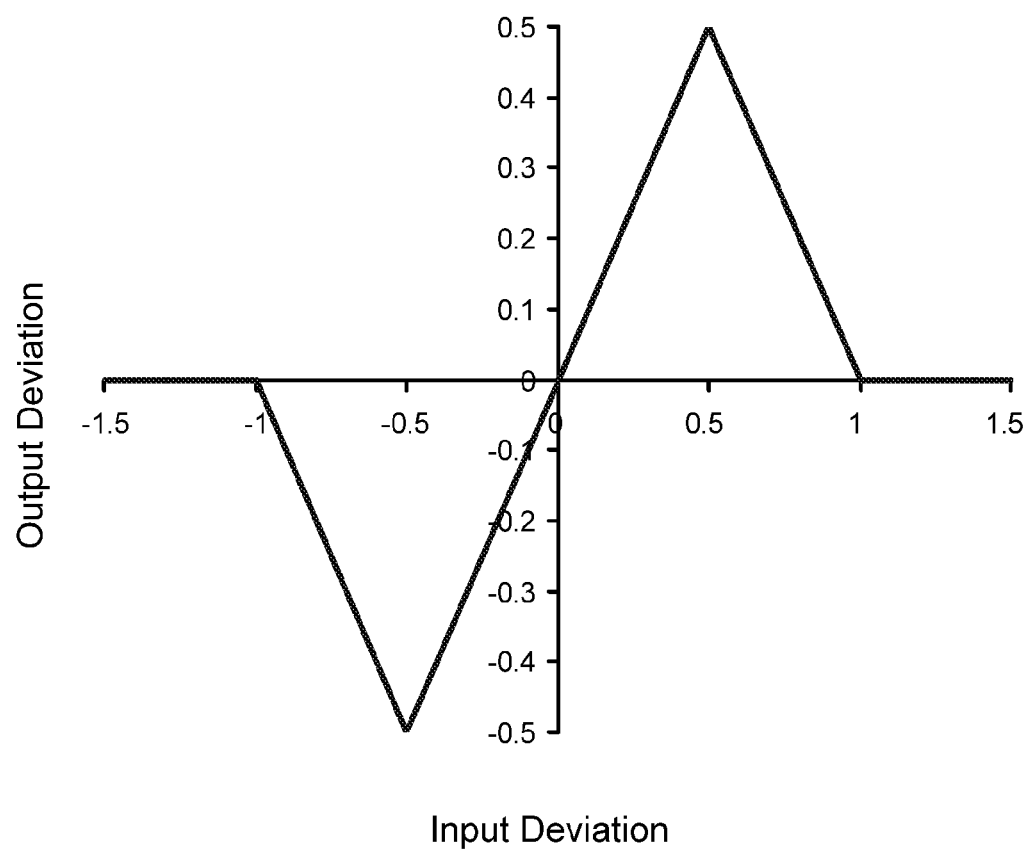
FIG. 3 illustrates a function that may be used to limit quantization errors.

FIG. 3 shows an example of a limiting function that might be applied to filter the floating point values.

The limiting function illustrated in FIG. 3 constrains any difference between the converted floating point value and the corresponding integer table entry to lie between +1 and −1. Any changes larger than these are limited to the maximum of +1 for positive values and −1 for negative values.

For values between −1 and +1, the changes are assumed to be linearly related to the input values.

For changes between −0.5 and +0.5, the output of the limiting function is the input value.

For changes between −1 and −0.5 or between +0.5 and +1, the changes are damped so that the magnitude increases from 0 at the limits to a maximum value of 0.5.

Other limiting functions may be used or some other form of filtering applied to ensure that the set of floating point values are representative of a smooth curve.

An alternative filtering might be to pass the raw converted values through a low pass filter to smooth out any deviations.

The process of conversion of the second lookup table proceeds analogously to that used for the first lookup table. In step S206, the second lookup table is converted to a set of floating point values using the conversion techniques described above. The output of this conversion is then filtered in step S208 to ensure that the second set of values also represents a smooth function. The conversion process of S206 and the filtering process of S208 are assumed to be identical to the corresponding conversion process used in S202 and the filtering process used in S204.

The combination begins by applying a standard input sequence to the set of floating point values from the first lookup table in step S210. This standard input sequence will typically be just the set of possible input values to the lookup table in sequential order. For example, for the 8-bit tables being described herein, the standard sequence would consist of the decimal integers starting with 0 and ending with 255. Other sequences may be used if appropriate.

The result of applying the standard input sequence to the set of floating point values from the first lookup table is just a set of floating point values that represents the set of output values that correspond to the set of possible input values. This set of output values from step S210 is now applied to the set of floating point values from the second lookup table in step S212.

Because the output of step S210 is a set of floating point values, a continuous method is used to compute the output that results from using the output of S210 as input to the second set of floating point values. Simple linear interpolation could suffice; when higher accuracy is desired a higher order interpolation method can be used.

The output of step S212 is now a set of floating point values that represents the effect of passing all possible input values through both lookup tables. The output differs from the output that would be obtained by passing the standard input sequence through the first lookup table and then passing the output of the first lookup table through the second lookup table.

The difference is that the result of passing the standard input sequence through the two integer lookup tables results in a set of output values that are restricted to integer values between 0 and 255. The result of the process described above, in steps S202 through S212, results in a set of floating point values that may take on a continuous range of values, including non-integer values.

In step S214, a rescaling operation can be applied to the output values from step S212. This rescaling can accommodate possible shifts in the origin of the input values. Alternatively, the rescaling can increase the possible range of the output values. This could allow a set of tables that were originally designed for an 8-bit system to be expanded to accommodate a larger output value range; e.g., 10-bit or 12-bit system.

Finally in step S216 the rescaled set of floating point values is quantized. This quantization step will result in the set of integer values that will comprise the content of the combined lookup table.

Figure 4:
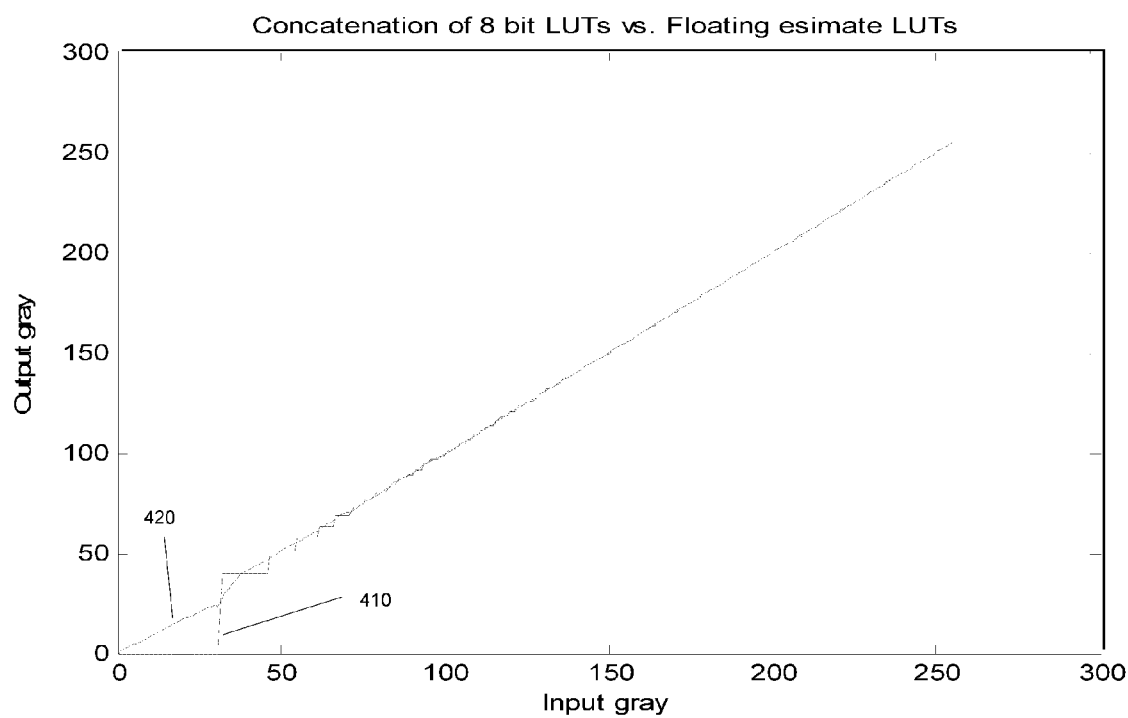
FIG. 4 shows a comparison of two ways of combining lookup tables.

As an example, FIG. 4 shows a comparison of two different ways of concatenating two lookup tables. The two tables were chosen so that the first table implements a gamma mapping with parameter ⅓ and the second table implements a gamma mapping with parameter 3. Since the two transforms are inverses of each other the result of the concatenation should be a unity transform.

In FIG. 4, the dashed line represents the concatenation that would be achieved by simply combining the two 8-bit lookup tables in sequence. The solid line in FIG. 4 shows the result of concatenating the two lookup tables using the process described above. The improvement of the present description creates a smoother transform, particularly, in this case, for lower input values.

Figure 5:
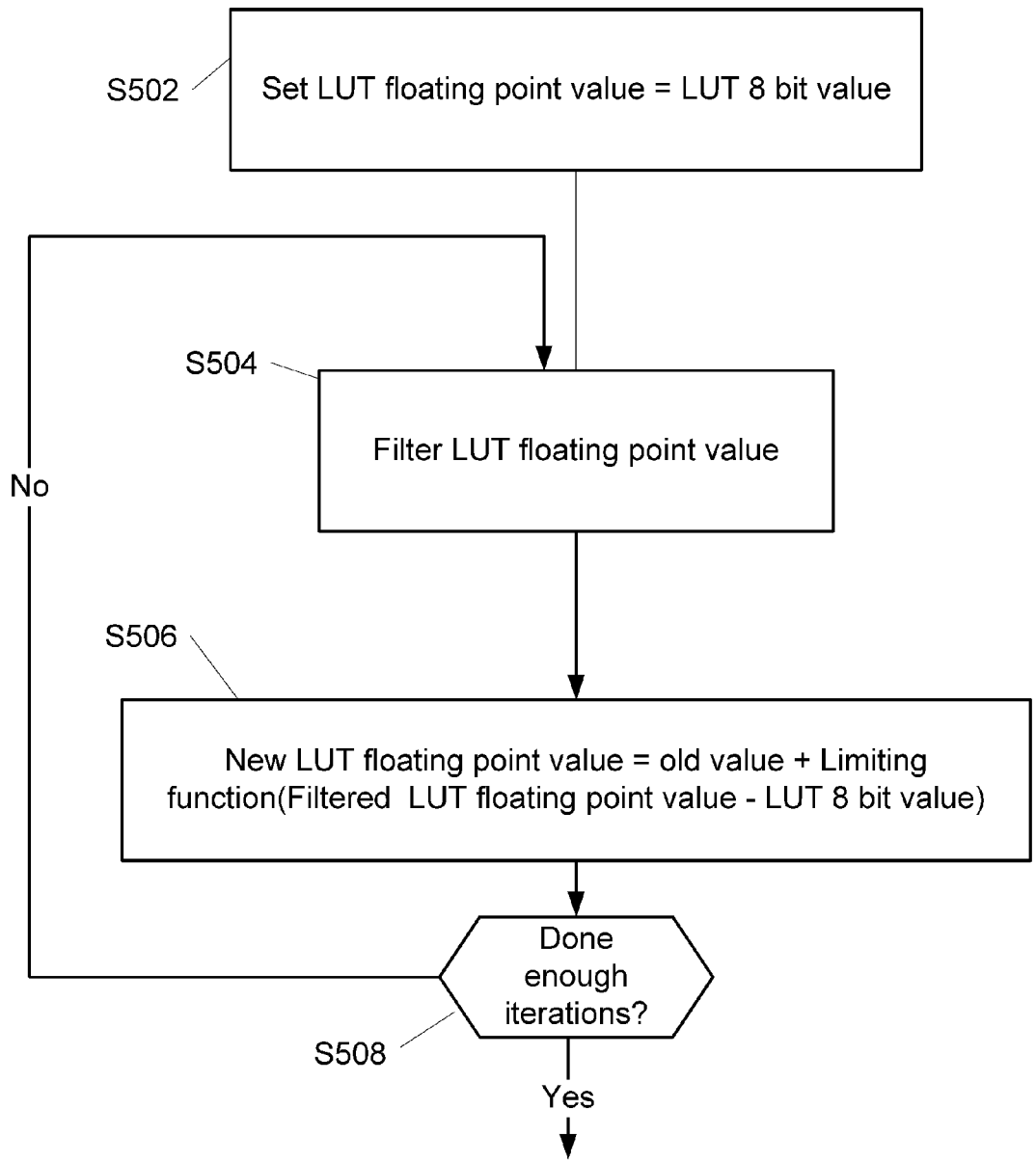
FIG. 5 shows a method of iterating a lookup table conversion process.

The conversion process of steps S202 and S206 can be improved by iterating the conversion process. FIG. 5 shows, in flowchart form, a way to iterate the conversion.

In step S502, the estimate of the lookup table floating point values are initially set to be equal to the integer values from the 8-bit lookup table. In step S504, the set of floating point values are low pass filtered. Alternatively, other conversion methods could be applied here as described above in connection with step S202 in FIG. 2.

In step S506, the floating point values are updated by adding to the old values the values of the limiting function as described above in connection with S204 of FIG. 2. This might be a deviation function as described in FIG. 3 or some other form of limiting function as desired.

In step S508, a check is made to determine if enough iterations have been performed. The number of iterations might be a single fixed number, or alternatively, the number of iterations could be determined by some convergence criterion.

An example of a convergence criterion would be to track the largest change of any floating point value in step S506 and stopping iteration when the largest change falls below a predetermined threshold.

The above process may also be carried out in response to some external event. Examples of such external events might include user input that requests some change in the image processing. Another example of an external event would be a signal from the printing engine that one of its characteristics has changed and the image processing needs to be modified to compensate for the change to the printing engine.

When the need arises to combine two lookup tables in response to an external event, one set of floating point values will be generated from the parameters and requirements of the triggering event rather than from conversion of a predetermined integer table.

For example, when the external event is generated due to a change in the printing engine, a tone compensation curve that is supposed to match the printing engine's characteristics would have to be changed. Based on the specific change to the engine, a supplemental tone curve could be generated.

This tone curve could be directly generated as a set of floating point values. These floating point values can then be combined with a set of floating point values that are generated from the lookup table that contains the tone compensation curve. The floating point values from the lookup table would be generated by the process described with respect to steps S202, S204, and S206 of FIG. 2.

Alternatively, the floating point values from the lookup table could be generated by the iterative procedure described in FIG. 5.

Once a set of floating point values from the lookup table and a set of floating point values from the external event have been generated, the two sets can be combined using the process described with respect to steps S210 and following of FIG. 2.

In a similar fashion, when the external event is generated by a user requesting a change in the way that images are processed, for example by asking for a change in the contrast or brightness of the image, a set of floating point values can be generated that implement the requested changes. Algorithms to implement changes to image processing are commonly known in the art and will not be described here.

The processes described herein may be implemented in a variety of ways. The processes may be included as part of the instruction set of a processor that manages the image processing. Alternatively, the processes may be implemented as a separate custom integrated circuit or a separate processor with a set of instructions that implement the desired process.

Figure 6:
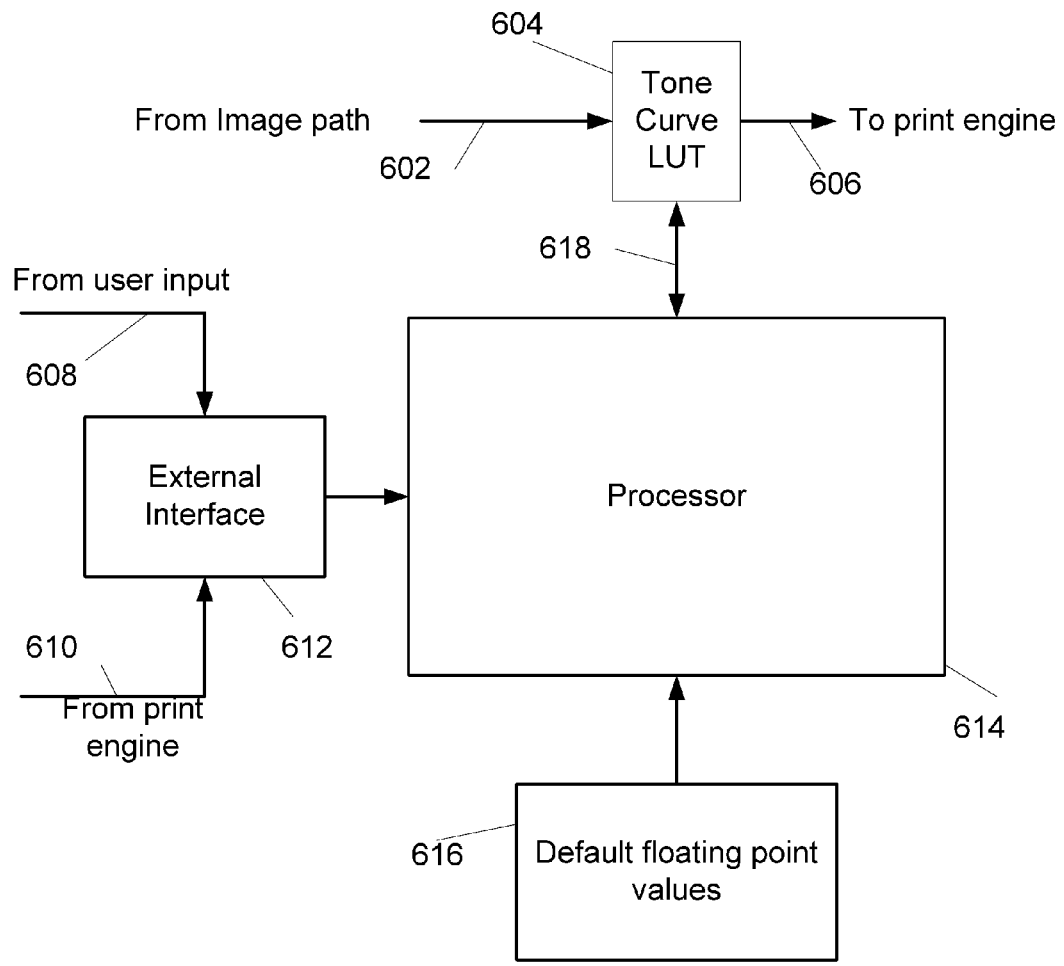
FIG. 6 shows a block diagram of a system to combine lookup tables in response to an external event.

FIG. 6 shows one such implementation. Only part of the image path is shown for simplicity. The tone curve lookup table 604 contains a set of values that compensate for the print engine characteristics. The input to the tone curve lookup table 604 contains a set of values that will adjust the image characteristics to compensate for any non-linearity or other distortions of the print engine. The input 602 to the tone curve lookup table 604 is from the previous part of the image path, and the output 606 of the tone curve lookup table 604 goes to the print engine.

The tone curve lookup table is connected, via a bidirectional interface 618 to a processor 614. The processor 614 is connected to a memory, 616, that stores a default set of values for the tone lookup table. The set of values stored in the memory 616 are in the converted floating point form of the integer values that will actually be stored in the table.

The processor is also connected to an external interface 612. The external interface 612 can accept inputs from the print engine via port 610, or the external interface can accept inputs from user requests 608. The external interface 612 can communicate the nature of any of these external events to the processor 614.

When the processor 614 receives input from the external interface 612, the processor 614 examines the input to identify the specific event that has generated the input. Based on the parameters of the initiating event, the processor 614 can generate, using predetermined algorithms, a set of floating point values that, when combined with the default tone curve lookup table, will properly respond to the external event. When the event arises as a result of a change in the print engine, the processor 614 generates a set of floating point values that will correct for the engine change. When the event has arisen due to a user request, the processor 614 will generate a set of floating point values to modify the image processing to respond to the user request.

Once the set of floating point values has been generated in response to an external event, the processor 614 can read the contents of the memory 616 to obtain the set of floating point values for the default tone curve lookup table. These values are the same as would be generated as if one took the default integer values from the tone curve lookup table and processed the default integer values using the method described with respect to steps S202, S204, and S206 of FIG. 2.

In this case, it is not necessary to read the values in the tone curve lookup table since one can assume that the values will be the default values. Alternatively, the tone curve lookup table could be read directly.

The processor 614 can proceed with the combination process herein described with respect to steps S210 and following of FIG. 2. At the end of the processing, the processor 614 has a set of integer values representing the combined tone curve lookup table. The processor 614 can load these values into the tone curve lookup table via the interface 618.

As has been described above, The processor 614 of FIG. 6 may be implemented in a variety of ways. Those skilled in the art will recognize that the system described in FIG. 6 is representative of how a processor might be implemented. Alternative implementations are possible without deviating from the intent of the design described in FIG. 6.

What has been described include several methods and a system for modifying a lookup table in response to an event.

An example of such a method may convert the values in a first lookup table from integer to a first set of floating point values the floating point values representing a function of an input variable; filter the first set of floating point values to reduce quantization errors; convert the values in a second lookup table from integer to a second set of floating point values, the floating point values representing a function of an input variable; filter the second set of floating point values to reduce quantization errors; apply a standard sequence of values as input to the function represented by the first set of floating point values to generate a first transformed standard sequence; apply the first transformed standard sequence as input to the function represented by the second set of floating point values to generate a second transformed standard sequence; and quantize the second transformed standard sequence to generate a combined lookup table.

The method may convert using a low pass filter, a polynomial interpolating function, a spline interpolation, or a min-max fitted function. The method may filter using a limiting function or a low pass filtering function.

The method may quantize by applying a scaling function to convert the second transformed standard sequence to cover a different range of input values than the standard sequence values.

The method may repeat the converting and filtering a fixed number of times.

The method may convert and filter repeatedly until a predetermined convergence criterion is met.

In another example, a method for modifying a lookup table in response to an event might may convert the values in a the lookup table from integer to a first set of floating point values; filter the first set of floating point values to reduce quantization errors; generate a second set of floating point values, the generated floating point values being responsive to an event; apply a standard sequence of values to the first set of floating point values to generate a first transformed standard sequence; apply the first transformed standard sequence to the second set of floating point values to generate a second transformed standard sequence; and quantize the second transformed standard sequence to generate a combined lookup table.

The event may be generated by action of a user or a change of a parameter of a machine.

The method may convert using a low pass filter or filter using by a limiting function.

A system for modifying a lookup table in response to an event, the system may include a lookup table containing a predetermined set of default values; an external interface, the interface generating an event in response to an external action; a processor, the processor operably connected to the lookup table, wherein the operable connection allows the processor to read and write the contents of the lookup table, and further wherein the processor is operably connected to the external interface, and wherein the processor contains a stored set of floating point values, the floating point values corresponding to the default set of values contained in the lookup table, and wherein the processor generates a second set of floating point values, the second set of floating point values being responsive to the external event, and wherein the processor combines the stored set of floating point values with the second set of floating point values to produce a third set of floating point values, and; wherein the processor quantizes the third set of floating point values and stores the quantized values in the lookup table.

The external action may be generated by action of a person or by change of a parameter of a machine.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating a tonal-reproduction-curve for a printing apparatus by combining digital lookup tables comprising:
   converting, using a processor, the values in a first lookup table from integer to a first set of floating point values the floating point values representing a function of an input variable;
   filtering, using an electronic circuit, the first set of floating point values to reduce quantization errors;
   converting, using the processor, the values in a second lookup table from integer to a second set of floating point values, the floating point values representing a function of an input variable;
   filtering, using the electronic circuit, the second set of floating point values to reduce quantization errors;
   applying a standard sequence of values as input to the function represented by the first set of filtered floating point values to generate a first transformed standard sequence;
   applying the first transformed standard sequence as input to the function represented by the second set of filtered floating point values to generate a second transformed standard sequence;
   quantizing the second transformed standard sequence to generate a combined lookup table; and
   storing, in an electronic memory, the combined lookup table as the tonal-reproduction-curve for the printing apparatus.

2. The method of claim 1 wherein the combined lookup table is stored in a memory.

3. The method of claim 1 wherein the converting uses a low pass filter.

4. The method of claim 1 wherein the converting uses a polynomial interpolating function.

5. The method of claim 1 wherein the converting uses a spline interpolation.

6. The method of claim 1 wherein the converting uses computing a min-max fitted function.

7. The method of claim 1 wherein the filtering is done via a limiting function.

8. The method of claim 1 wherein the filtering is done via a low pass filtering function.

9. The method of claim 1 wherein the quantization applies a scaling function to convert the second transformed standard sequence to cover a different range of input values than the standard sequence values.

10. The method of claim 1 wherein the converting and filtering is repeated a fixed number of times.

11. The method of claim 1 wherein the converting and filtering is repeated until a predetermined convergence criterion is met.

12. A method for generating a tonal-reproduction-curve for a printing apparatus in response to an event comprising:
   converting, using a processor, the values in a the lookup table from integer to a first set of floating point values;
   filtering, using an electronic circuit, the first set of floating point values to reduce quantization errors;
   generating a second set of floating point values; the generated floating point values being responsive to an event;
   applying a standard sequence of values to the first set of floating point values to generate a first transformed standard sequence;
   applying the first transformed standard sequence to the second set of floating point values to generate a second transformed standard sequence; and
   quantizing the second transformed standard sequence to generate a combined lookup table; and
   storing, in an electronic memory, the combined lookup table as the tonal-reproduction-curve for the printing apparatus.

13. The method of claim 12 wherein the event is generated by action of a user.

14. The method of claim 12 wherein the event is generated by change of a parameter of a machine.

15. The method of claim 12 wherein the converting uses a low pass filter.

16. The method of claim 12 wherein the filtering is done by a limiting function.

17. A system for generating a tonal-reproduction-curve for a printing apparatus in response to an event, the system comprising:
   a memory having a lookup table, the table containing a predetermined set of default values;
   an external interface, the interface generating an event in response to an external action; and
   a processor, the processor operably connected to the lookup table, wherein the operable connection allows the processor to read and write the contents of the lookup table;
   said processor being operably connected to said external interface;

said processor including a stored set of floating point values, the floating point values corresponding to the default set of values contained in the lookup table;

said processor generating a second set of floating point values, the second set of floating point values being responsive to the external event;

said processor combining the stored set of floating point values with the second set of floating point values to produce a third set of floating point values;

said processor quantizing the third set of floating point values and stores the quantized values in the lookup table in the memory;

said processor storing, in an electronic memory, the combined lookup table as the tonal-reproduction-curve for the printing apparatus.

18. The system of claim 17 wherein the external action is generated by action of a person.

19. The system of claim 17 wherein the external action is generated by change of a parameter of a machine.

* * * * *